United States Patent
Rogowski et al.

(10) Patent No.: US 10,853,381 B2
(45) Date of Patent: Dec. 1, 2020

(54) DOCUMENT SEARCH WRAPPER

(71) Applicant: SAP SE, Walldorf (DE)

(72) Inventors: Justus Rogowski, Walldorf (DE);
Matthias Aurin, Walldorf (DE);
Silvana Gemmel, Walldorf (DE)

(73) Assignee: SAP SE, Walldorf (DE)

( * ) Notice: Subject to any disclaimer, the term of this patent is extended or adjusted under 35 U.S.C. 154(b) by 696 days.

(21) Appl. No.: 15/265,851

(22) Filed: Sep. 15, 2016

(65) Prior Publication Data
US 2017/0004186 A1    Jan. 5, 2017

Related U.S. Application Data (62) Division of application No. 13/289,649, filed on Nov. 4, 2011, now abandoned.

(51) Int. Cl.
| | |
|---|---|
| *G06F 7/00* | (2006.01) |
| *G06F 16/248* | (2019.01) |
| *G06F 16/93* | (2019.01) |
| *G06F 16/2455* | (2019.01) |

(52) U.S. Cl.
CPC ........ *G06F 16/248* (2019.01); *G06F 16/2455* (2019.01); *G06F 16/93* (2019.01)

(58) Field of Classification Search
CPC .... G06F 16/248; G06F 16/93; G06F 16/2455; G06F 16/9032; G06F 16/907; G06F 16/9027; G06F 16/951; G06Q 10/00; G06Q 50/16; G06Q 20/40; G06Q 40/06; G06Q 40/04
See application file for complete search history.

(56) References Cited

U.S. PATENT DOCUMENTS

| | | | |
|---|---|---|---|
| 6,625,595 B1* | 9/2003 | Anderson | G06F 16/30 |
| 6,988,095 B1* | 1/2006 | Dorfman | G06F 16/20 |
| 2002/0143764 A1* | 10/2002 | Martin | G06F 16/252 |
| 2005/0138043 A1* | 6/2005 | Lokken | G06Q 30/02 |
| 2008/0091663 A1* | 4/2008 | Inala | H04L 67/306 |
| 2010/0125589 A1* | 5/2010 | Avnur | G06F 3/0482 |
| | | | 707/754 |
| 2012/0158774 A1* | 6/2012 | Balkesen | G06F 17/10 |
| | | | 707/769 |
| 2012/0179513 A1* | 7/2012 | Siklos | G06F 16/285 |
| | | | 705/7.39 |

\* cited by examiner

*Primary Examiner* — Azam M Cheema
(74) *Attorney, Agent, or Firm* — Buckley, Maschoff & Talwalkar LLC (57) ABSTRACT

Various embodiments of systems and methods for a document search wrapper are described herein. A database search framework is provided for performing a database search. The database search framework includes a base search wrapper class and an application specific search wrapper class. The base search wrapper class includes common search methods and re-definable search methods. The common search method defines common search logic. The application specific search wrapper class includes the common search method inherited from the base search wrapper class and application specific search methods, created by redefining the re-definable search method. The database search framework may also include a search interface for providing pre-selection or post-filtering logic to the search.

17 Claims, 6 Drawing Sheets

| CLASS NAME | SELECTION CRITERIA | SELECTION TYPE | TABLE/OBJECT USED |
|---|---|---|---|
| CLASS_BILLING_FIND_BY_SOLD_TO_PARTY | SOLD TO PARTY | GET | "SOLD TO PARTY" INDEX TABLE |
| CLASS_BILLING_FIND_BY_PAYER | FIND BY PAYER | GET | "USE THIS" TABLE |
| CLASS_BILLING_FIND_BY_AUTHORIZED | FIND BY AUTHORIZED | CHECK | CURRENT DOCUMENT |

DOCUMENT SEARCH WRAPPER

CROSS-REFERENCES TO RELATED APPLICATIONS

This application is a divisional application of U.S. patent application Ser. No. 13/289,649 filed Nov. 4, 2011 which is incorporated herein by reference.

FIELD

Embodiments generally relate to computer systems, and more particularly to methods and systems for performing application specific searches.

BACKGROUND

A key requirement in application searching, such as that related to shipping, finance, etc. is to provide the possibility to search diverse document types pertaining to different areas. For example, in logistic application a requirement can be to provide the possibility for searching diverse document types pertaining to different areas within the logistics, such as, sales, procurement, distribution, material management, billing, etc.

At present, different modules/functions are provided with respect to each of these areas, which allows execution of searches corresponding to diverse areas. Further, in order to allow a user to perform searches on a wide variety of selection criteria, several search modules may be provided which may vary in very small proportion. However, for a consumer of a search functionality it is difficult to find an application that fits the consumer's need in term of selection criteria, desired result structure, and performance goals.

SUMMARY

Various embodiments of systems and methods for document search wrapper are described herein.

In one aspect, a base search wrapper class includes a common search method defining common search logic, and a re-definable search method.

In another aspect, an application specific search wrapper class includes the common search method inherited from the base search wrapper class, and an application specific search wrapper class created by re-defining the re-definable search method of the base search wrapper class.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for document search wrapper are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
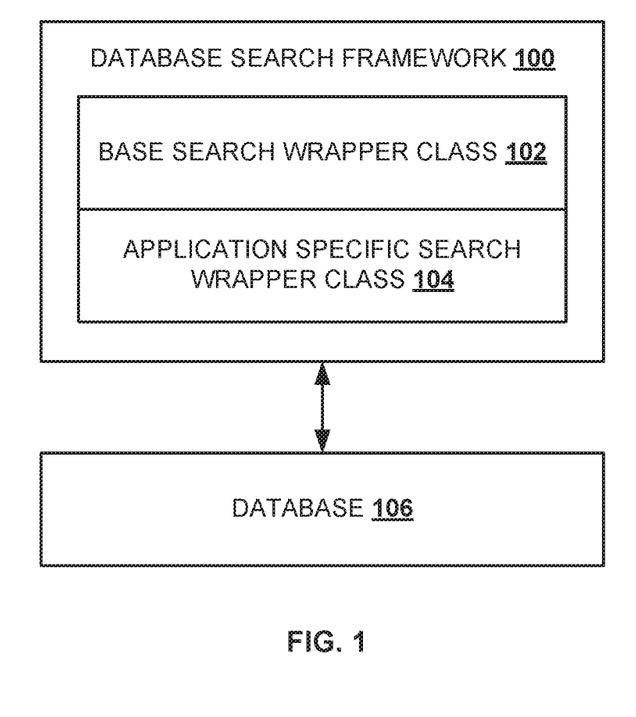
FIG. 1 is a block diagram illustrating a database search framework, according to an embodiment.

FIG. 1 is a block diagram illustrating a database search framework 100, according to an embodiment. As shown, the database search framework 100 includes a base search wrapper class 102 and an application specific search wrapper class 104. The base search wrapper class 102 includes common search methods and re-definable search methods. The common search methods define a search logic (common search logic) that is common for different applications. For example, a "get documents" method is a common search method, included in the base search class 102, defined to receive a search request and initiate database search. This search method can be used as one of the common search methods for different applications: such as a shipping application, a billing application, or a sales application. The re-definable search methods are to be re-defined according to the type of application or according to the user selection. For example, a "determine selection sequence" method is a re-definable search method which defines the sequence in which different classes are to be called during a search.

The application specific search wrapper class 104 is created for performing database search related to a particular application. For example, a "billing" application specific search wrapper class is created for performing database search related to "billing" application. In one embodiment, the application specific search wrapper class 104 includes the common search methods inherited from the base search wrapper class, and application specific search methods created by re-defining the re-definable search methods of the base search wrapper class. The created application specific search wrapper class 104 is adapted to communicate with a database 106. In one embodiment, the common search methods and the application specific search methods of the application specific search wrapper class 104 are defined to search the database 106, based on the search query received by the database search framework 100 and provides the search results of the search query.

In the above example, the "billing" application specific search wrapper class may include the "get documents" method (common search method) inherited from the base search wrapper class, and a billing specific search method created by re-defining the "determine selection sequence" method. In this case, the "determine selection sequence" method is re-defined, by a user, by providing a sequence in which different classes are to be called for a "billing" specific database search.

Figure 2:
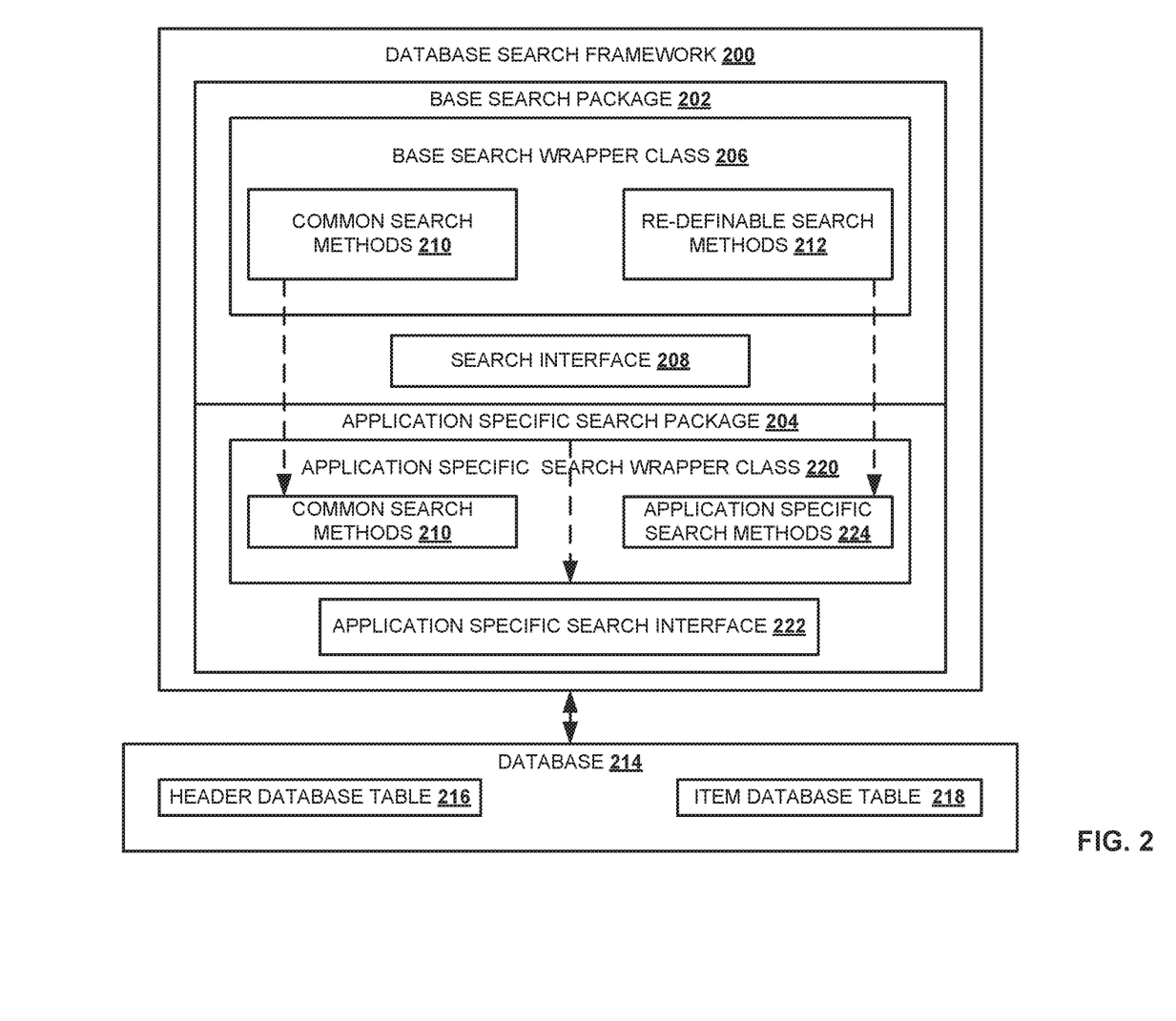
FIG. 2 is a detailed block diagram illustrating a database search framework, according to an embodiment.

FIG. 2 is a detailed block diagram illustrating a database search framework 200, according to an embodiment. The database search framework 200 includes a base search package 202 and an application specific search package 204. The base search package 202 includes a base search wrapper class 206 and a search interface 208. As discussed above, the base search wrapper class 206 includes common search methods 210, which define common search logic, and re-definable search methods 212. The base search wrapper class 206 and the search interface 208, included in the base search package 202 are defined to perform search for any type of document. In one embodiment, the base search wrapper class 206 and the search interface 208 are defined to search any type that has a header/item structure. An implementer can use the base search package 202 to create application specific search package 204, for application specific searching, by re-defining the re-definable search methods 212, according to the type of application, and by defining the search interface 208 according to the search options ("find by class") that the implementer wants to provide for the particular application.

The search interface 208 includes methods to plug-in pre-selection or post-filtering logic for the database search. Pre-selection may be a selection process performed before searching the database 214. During pre-selection, tables, such as index tables may be searched to obtain a set of unique identifiers, which can then be used for searching the database 214. The search interface 208 may be, for example, an "if find documents by elements" interface which includes three methods: a "get instance" method, a "get documents by" method, and a "check documents by" method.

The "get instance" method is defined to create and return an instance of a "find by class" corresponding to a selection criteria in a search request. A search request may include a plurality of selection criteria. The selection criteria may have a corresponding "find by class". The "find by class" identifies a table on which a search (pre-selection) is to be performed, based on the selection criteria. The table may be, for example, an index table which may have the selection criteria as a key field or an index. For example, consider a search request "please provide details of all employees with salary above 10000 $ and age above 30 years." This search request has two selection criteria: "salary" (salary above 10000 $) and "age" (age above 30 years). The "get instance" method creates an instance of a "find by salary class" corresponding to the selection criteria "salary" and an instance of a "find by age class" corresponding to the selection criteria "age". The "find by salary class" may identify a salary index table, which has salary as a key field or index. The salary index table may have only two fields: a unique identifier field, which includes unique identifiers, such as name, identification (id) no., etc. that identifies a database entry, corresponding to an employee, in the database 214, and a salary field, which includes salary data of the employees. Similarly, the "find by age class" may identify an age index table, which may include a unique identifier field, which includes unique identifiers of the employees, and an age field, which includes the age of the employees. The "get documents by" method is defined to pre-select the unique identifiers from the tables, identified by the "find by class", based on the selection criteria. The "get documents by" method returns the list of selected identifiers. In the above example, the "get documents by" method may search the age index table and the salary index table with the search criteria "age above 30 years" and "salary above 10000$", respectively. The "check documents by" method is defined to check whether the search results obtained after searching the database tables is valid for a given selection criteria (post-filtering logic).

The common search methods 210 of the base search wrapper class 206 may include several methods, for example, a "get documents" method, a "search documents" method, a "check and transfer main" method, a "check and transfer main item" method, and a "get next result pack" method. In one embodiment, the "get documents" method is defined to receive a search request. The "get documents" method may be called by an application, such as an analytics application, which sends the search request. In the above example, the "get documents" method receives the search request "please provide details of all employees with salary above 10000 $ and age above 30 years." The "get documents" method is also defined to store the selection criteria, in the received search request. In the above example, the "get documents" method stores the search criteria "salary" and "age" in the base search wrapper class 206. The "get documents" method may also receive a result structure in which the user wants to view the search results.

The "get documents" method is also defined to initiate the determination of the "find by class" based on the selection criteria, and a selection sequence in which the determined "find by class" are to be called. The "get documents" method determines the "find by class" by calling the "get instance" method, which creates instances of the "find by class", corresponding to the selection criteria in the received search request. The "get documents" method may determine the selection sequence for calling the determined "find by class", either based on a default sequence defined for a particular application or based on a user defined selection sequence. In the above example, the selection sequence for calling the "find by class" may be the "find by age class" followed by the "find by salary class". Based on the selection sequence of the "find by class", the salary index table (identified by the "find by age class") is searched followed by the age index table (identified by the "age find by class").

In one embodiment, the "search documents" method is defined to initiate pre-selection for the received search request. As discussed above, pre-selection is a process performed before searching the database 214. In one embodiment, the database 214 is searched with the selection criteria, which has not been selected during the pre-selection. The "search documents" method calls the "get documents by" method of the "if find documents by elements" interface for selecting (pre-selecting) a list of unique identifiers. In the above example, the "search documents" method returns a list of unique identifiers obtained after searching the index tables, the age index table and the salary index table, with the search criteria "age above 30 years" and "salary above 1000$", respectively. In one embodiment, the "check and transfer main" method and the "check and transfer main item" method are called after receiving the search results, obtained by searching the database tables.

The "check and transfer main" method calls the "check documents by" method, of the ""if find documents by elements" interface, to check whether the search result is valid for a given search criteria. The "check and transfer main" and "check and transfer main item" method also transfer the search result to the result structure, received from the user in the "get documents" method.

Further, in one embodiment, a packaging concept is also provided to enable a user to restrict the search results in packages. The "get documents" method provides a part of the "packaging" concept via a parameter "IV_MAXSEL", which allows the user to set a maximum number of search results that can be returned. A parameter "EV_MORE_ENTRIES" of the "get documents" method indicates to the user that more search results are available. The method "get next result" allows the user to retrieve these additional results by calling a re-definable "get main" method.

Further, as discussed above, the base search wrapper class may also include re-definable search methods 212. The re-definable search methods 212 may be abstract methods which are to be re-defined according to the type of the application or according to user requirement. The re-definable search methods 212 may include several search methods, for example, a "get main" method, a "get main item" method, a "constructor" method, a "determine selection sequence" method, and a "move results" method.

In one embodiment, the "get main" method and the "get main item" method define the steps for performing the "main" selection, on the database tables, after the pre-selection. The "search documents" method calls the "get main" method after receiving the list of unique identifiers as a result of the pre-selection. As shown, the database 214 stores a header database table 216, which stores header related data, and an item database table 218, which stores item related data. The "get main" method includes steps for searching (performing selections)on the header database table 216 and the "get main item" method includes steps for searching (performing selections) on the item database table 218.

The "get main" method is defined to perform a set of steps, which may include: initially retrieving the unique identifiers, obtained after the pre-selection. Next the selection criteria stored in the base search wrapper class 206 is retrieved. Next, a check is performed to determine the package size for the result, and whether additional search results (greater than the maximum package size) has been requested. Next, a selection condition may be created based on the unique identifiers received after the pre-selection and the remaining selection criteria which has not been searched during the pre-selection. Next, a header database table 216, which respects the selection criteria in the search request, the created selection condition, and the unique identifiers received after the pre-selection, is selected for performing the "main" selection. A search is performed on this header database table 216 based on the created selection condition to obtain a set of search results. Next, the "check and transfer main" method, is called for checking the obtained search result (based on the post-filtering logic) and transferring the search results to the result structure selected by the user. Next, the "get main item" method is called for performing the "main" selection on the item database table 218. Finally, a check is performed to determine if a result table, which has been defined to contain the search results, is filled with the search results. The "get main item" method includes similar steps as the "get main" for performing the main search on the item table of the database.

The "constructor" method is defined to receive the internal attributes of an application specific search wrapper class 220 and an application specific search interface 222 of the application specific search package 204. The internal attributes may be, for example, a name of the application for which the application specific search wrapper class 220 is to be created, the name of the application specific search wrapper class 220, etc. The "determine selection sequence" method is defined to receive the selection sequence in which the "find by class" are to be called for the pre-selection.

The application specific search package 204 includes the application specific search wrapper class 220 and the application specific search interface 222. As shown, the application specific search wrapper class 220 includes common search methods 210 inherited from the base search wrapper class 206. For example, the application specific search wrapper class 220 may include the "get documents" method, the "search documents" method, the "check and transfer main" method, the "check and transfer main item" method, and the "get next result pack" method. The "get documents" method stores the selection criteria, in the search request, in the application specific search wrapper class 220. The application specific search wrapper class 220 also includes an application specific search interface 222 obtained by re-defining the re-definable search methods 212 of the base search wrapper class 206. An implementer may re-define the re-definable search methods 212 to obtain the application specific search methods 224. In one embodiment, internal or external business ad-ins (BADI) may be provided for re-defining the re-definable search methods 212.

For example, the re-definable "get main" method and the re-definable "get main item" method may be re-defined by indicating the header database table 216 and the item database table 218, respectively, on which the "main" selection is to be performed. Consider, for example, that the application specific search wrapper class 220 is to be created for a "billing" application. An implementer, implementing the "billing" search wrapper class may redefine the "get main" method of the base search wrapper class by indicating the "billing" header database table, which stores header data related to billing. In this case, the "main" selection for the "get main" method is to be performed on the "billing" header database table. The application specific search method 224, created by re-defining the "get main" method, is adapted to communicate with the "billing" header database table. Similarly, the method "get main item" may be redefined, for the billing search wrapper class, by the implementer by indicating the "billing" item table, which stores item data for billing, on which the "main" selection for item level data is to be performed. The application specific search method, 224 created by re-defining the "get main item" method is adapted to communicate with the "billing" item database table. Similarly, the "constructor" method may be re-defined by providing values for each of the internal attributes. The "determine selection sequence" method can be defined based on a default selection sequence for a particular application. For example, a default selection sequence for "billing" application may be to first call the find by class for a payer, followed by the find by class for a sold to party. The standard selection sequence may be changed by a user.

The application specific search interface 222 is an application specific implementation of the search interface 208 of the base search package 202. An implementer may create the application specific search interface 222 by defining the "find by class" corresponding to the different selection criteria for a particular application. For example, consider that the application for which the application specific search interface 222 is to be created is a billing application, and the different possible selection criteria for billing application are "payer", "sold to party", and "billing date." The implementer may create a "find by player class", a "find by sold to party class", and a "find by billing date class" corresponding to the selection criteria "payer", "sold to party", and "billing date", respectively. The implementer may also identify a table, such as an index table, corresponding to the find by class. The table may be an index table, a user created table or any other structure storing portions of data stored in the database 214. The identified table may store data related to the selection criteria. The implementer may also specify, whether the created "find by class" is to be implemented by a "get documents by" method or a "check documents by" method. In one embodiment, after receiving the selection criteria, in a search request, an instance of a "find by class" corresponding to the selection criteria is created. The instance of the "find class" may be created by instantiating the "find by class" defined in the application specific interface. The created instance of the "find by class" may be executed based on the "get document" method or the "check document" method, specified for the "find by class". In the above example, consider that a search request is received having "billing" as a search criteria. In this case, an instance of the "billing find by class", in the billing specific interface, is created.

Figure 3:
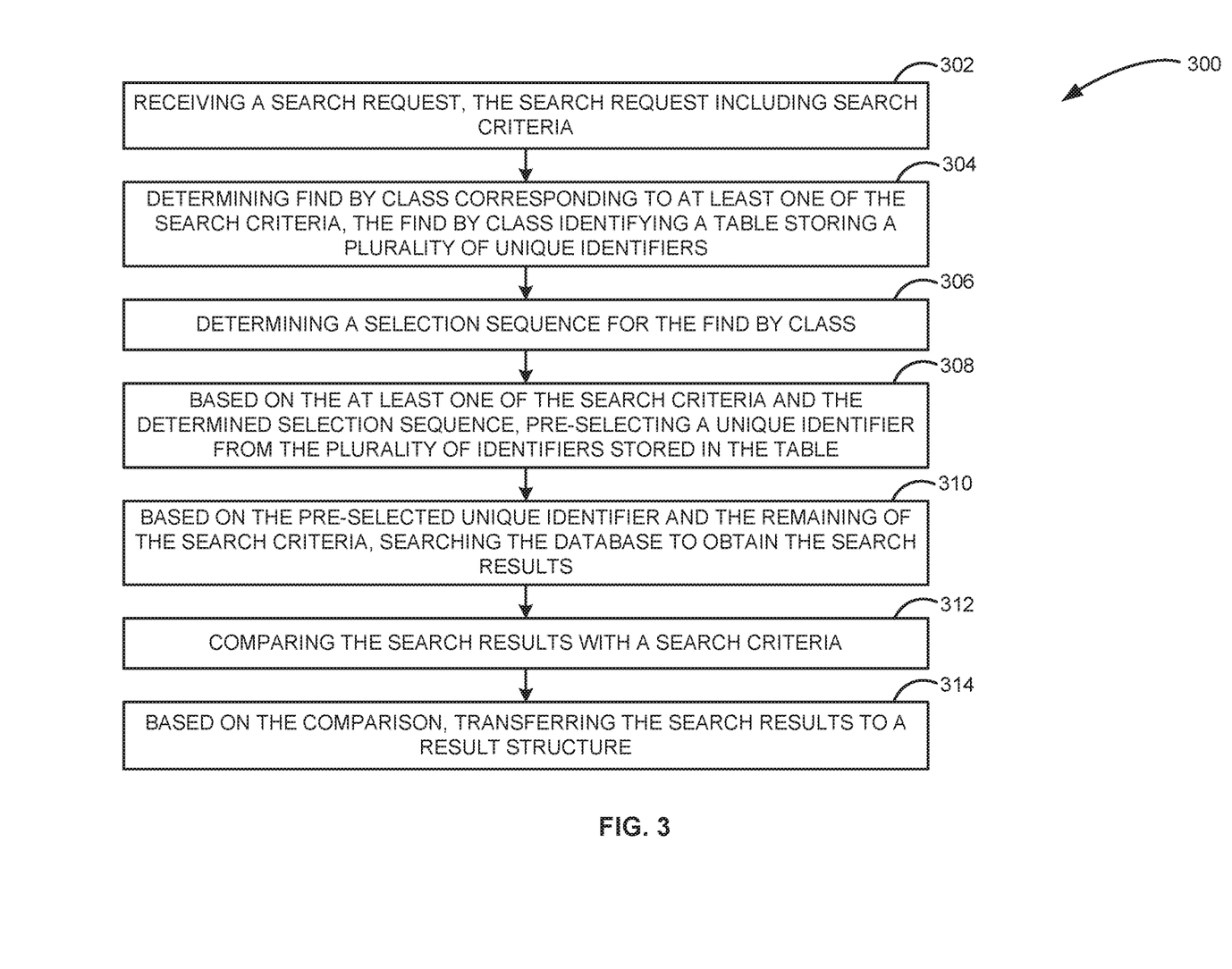
FIG. 3 is a flow diagram illustrating a method for performing a database search, according to an embodiment.

FIG. 3 is a flow diagram 300 illustrating a method for performing a database search, according to an embodiment. Initially at block 302 a search request is received by the database search framework. The search request may be received by the application specific search wrapper class included in the database search framework. An application may provide the search request to the database search framework for performing the database search. For example, an analytics application may, based on a search request received from a customer, call the database search framework for performing the database search. In one embodiment, the application calls the "get documents" method, of the application specific search wrapper class, which receives the search request. As discussed above, the received search request may include several selection criteria. For example, consider a search request related to a "shipping" application, "please provide the details of all batteries shipped to a company XYZ Corp. on 15 Oct. 2011." This search request includes three selection criteria: material sold (batteries), sold to party (XYZ Corp.), and delivery date (15 Oct. 2011). The three selection criteria of the search request may be stored in a "shipping" search wrapper class.

Next at block 304, a "find by class" corresponding to the selection criteria, in the received search request, is determined. After receiving the search request, the "get document" method, of the application specific search wrapper class, initiates the determination of the "find by class". In one embodiment, the determination of the "find by class" includes creating instances of the "find by class" corresponding to the selection criteria. The "get documents" method calls the "get instance" method, of the "if find documents by elements" interface to create an instance of the "find by class" corresponding to the selection criteria. The "get instance" method may create instance of "find by class" for only those selection criteria that has a corresponding "find by class" defined in the application specific interface. In the above example, consider that the shipping specific interface has defined a "find by class" corresponding to only two out of the three selection criteria: a "material sold find by class" corresponding the selection criteria "material sold", and a "sold to party find by class" corresponding to the selection criteria "find by class". The "act instance" method creates and returns an instance of the "material sold to" find by class and the "sold to party" find by class. Further, as discussed above, the "find by class" identifies a table, which is to be searched during the pre-selection process. The table may be, for example an index table, may store unique identifiers and data related to the selection criteria. In the above example, the "material sold to" find by class may identify a "material sold" index table which has the "material sold" as the key field or index. The "material sold to" index table may stores unique identifiers, which identifies an entry corresponding to the "material sold" in the database, and the "material sold" data. Similarly, the "sold to party" find by class may identify a "sold to party" index table which stores unique identifiers and the "sold to party" data, Next at block 306, the "get documents" method determines the selection sequence for calling the "find by class" determined at block 304. In one embodiment, the "find by class" are called for searching the tables referred by the "find by class." The tables referred by the "find by class" arc searched in the sequence in which the "find by class" are called. The selection sequence may be determined based on a default sequence for a particular application or a user defined sequence for the application. In the above example, the default sequence for a "shipping" application may include that: first the "ship to party" find by class is to be called, next the "sold to party find by class" is to be called, and finally the "material sold find by class" is to be called. Based on this default sequence, the "sold to party find by class" (corresponding to the "sold to party" sear criteria) is determined to be called first followed by the "material sold find by class" (corresponding to the "material sold" search criteria).

Next at block 308, based on the selection sequence determined at block 306, unique identifiers are selected (pre-selection) in the tables identified by the determined "find by class". The unique identifiers may be selected from the tables by comparing the selection criteria corresponding to the "find by class" with the entries of the table. In one embodiment, after determining the selection sequence of the "find by class", the "get document" method calls the "search documents" method, which initiates the pre-selection of the unique identifiers. The "search documents" method calls the "get documents by" method which executes the actual pre-selection of the unique identifiers from the tables. As discussed above, the tables referred by the "find by class" are searched in the sequence in which the "find by class" are called. Each table referred by the "find by class" are to be searched based on the search result of the previous table in the sequence.

In the above example, consider that the "sold to party" index table stores unique identifiers 1-20, which identifies data in the database, and "sold to party" data, and the "material sold" index table stores unique identifiers 1-25 and the "material sold" data. Based on the selection sequence, first the index table "sold to party" (identified by the "sold to party find by class") is searched with respect to the selection criteria "XYZ Corp.". Consider that the data corresponding to the unique identifiers 3, 7 and 9 matches with the selection criteria "XYZ Corp." Next, according to the selection sequence the index table "material sold" (identified by the material sold find by class is searched with respect to the selection criteria "batteries." In this search, the "materials sold" data corresponding to only the unique identifiers 3, 7, and 9, obtained after searching the index table "sold to party", in the index table "material sold" are matched with the selection criteria "batteries." Consider that, the "material sold" data corresponding to the unique identifier 7 and 9 matches with the selection criteria "batteries". In this case, the unique identifiers 7 and 9 are the pre-selected document identifiers, obtained after the pre-selection.

Next at block 310, based on the pre-selected documents and the remaining selection criteria from the plurality of selection criteria, a main selection is performed on the database to obtain the search result after the database search. The remaining selection criteria may be the selection criteria which does not have a corresponding "find by class" defined in the application specific search interface. The main search as discussed above is performed on the header database table and the item database table. The method "get document" calls the method "get main" and "get main item" for performing the main search on the header database table and the item database table. In the above example, the remaining selection criterion is "delivery date". The header database table and the item database table, corresponding to the unique identifiers 7 and 9, obtained after the pre-selection, are searched with the remaining selection criteria "delivery date." In case any of these documents matches with the selection criteria "delivery date" (15 Oct. 2011) it is provided as the search result.

Next at block 312, the obtained search results are checked with respect to search criteria to determine if the search results are valid for check criteria. The selection criteria may include any post-filtering logic that can be applied to filter the obtained search results. For example, the selection criteria may be an authorization check, which checks whether the user is authorized to view the search result. After, receiving the search results the method "get main" calls the method "check and transfer main" for checking the results. Next, the "check and transfer main" method call the method "check documents by", of the interface "if find document by elements", which checks whether the search result are valid for a given selection criteria and returns the search results which are valid.

Finally at block 314, the search results are transferred to a result structure. The search results in the result structure may be provided to the application that provided the search request to the database search framework. The search results which are determined as valid, after the check at block 312, are transferred to the result structure. As discussed above, a user may define a result structure, such as a table, where the user wants the search results to be transferred. The methods "check and transfer main" and "check and transfer main item" may transfer the result to the user defined result structure. In the above example, consider that the "delivery" date corresponding to unique identifier 9 matches with the selection criteria 15 Oct. 2011. Therefore, the data corresponding to unique identifier 9 is the search result. Further, consider that the user has defined a result structure to have only two fields a "material sold" field and a "delivery date" field. In this case, the "material sold" and the "delivery date" corresponding to unique identifier 9 are provided in the result structure defined by the user.

Figure 4:
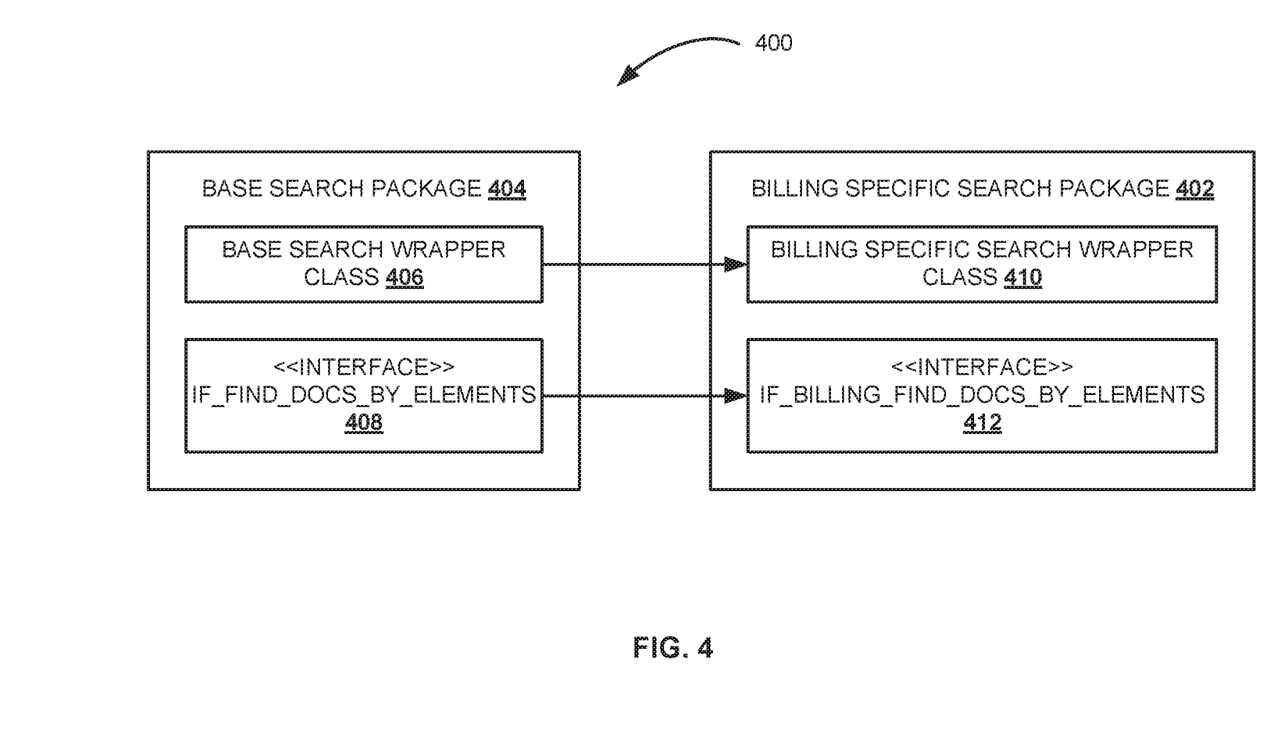
FIG. 4 is an exemplary block diagram illustrating creation of a billing specific search package based on a base search package, according to an embodiment.

FIG. 4 is an exemplary block diagram 400 illustrating creation of a billing specific search package 402 based on a base search package 404, according to an embodiment. As shown, the base search package 404 may include the base search wrapper class and an "if find documents by element" interface. The base search wrapper class 406 includes the common search methods and the re-definable search methods. The billing specific search package 402 may be created for performing database searches related to "billing" application. The billing specific search package 402 includes a billing specific search wrapper class 410. The billing specific search wrapper class 410 may include the common search methods inherited from the base search wrapper class 406 and billing specific search methods created by re-defining the re-definable search methods of the base search wrapper class 406. For example, a "billing" specific constructor method can be created by re-defining the "constructor" method of the base search wrapper class 406. An implementer re-defines the "constructor" method by providing the name of the search wrapper class as "billing specific search wrapper class" and the name of the billing specific interface as "if billing find documents by elements" interface. Similarly, a "determine selection sequence" method of the base search wrapper class 406 is re-defined. to obtain a billing specific selection sequence. The "billing specific selection sequence" may include a default selection sequence for billing or a user defined selection sequence for the "billing" application.

The billing specific search interface also includes an "if_billing_find_ docs_by_elements" interface 412. The "if_billing_find_docs_by_elements" interface 412 is a billing specific implementation of the "if_find_docs_by_elements" interface 408. As discussed above, the "if_find_docs_by_elements interface 408 include three methods: a "get instance" method, a "get documents by" method, and a "check documents by" method. An implementer creates the "if_billing_find_docs_by_elements" interface" 412 by defining "find by class" corresponding to different possible selection criteria for billing. The implementer may also specify a table identified by the find by class. The implementer may also specify whether the created "find by class" is to be implemented by a "get document by" method or a "check document by" method.

Figure 5:
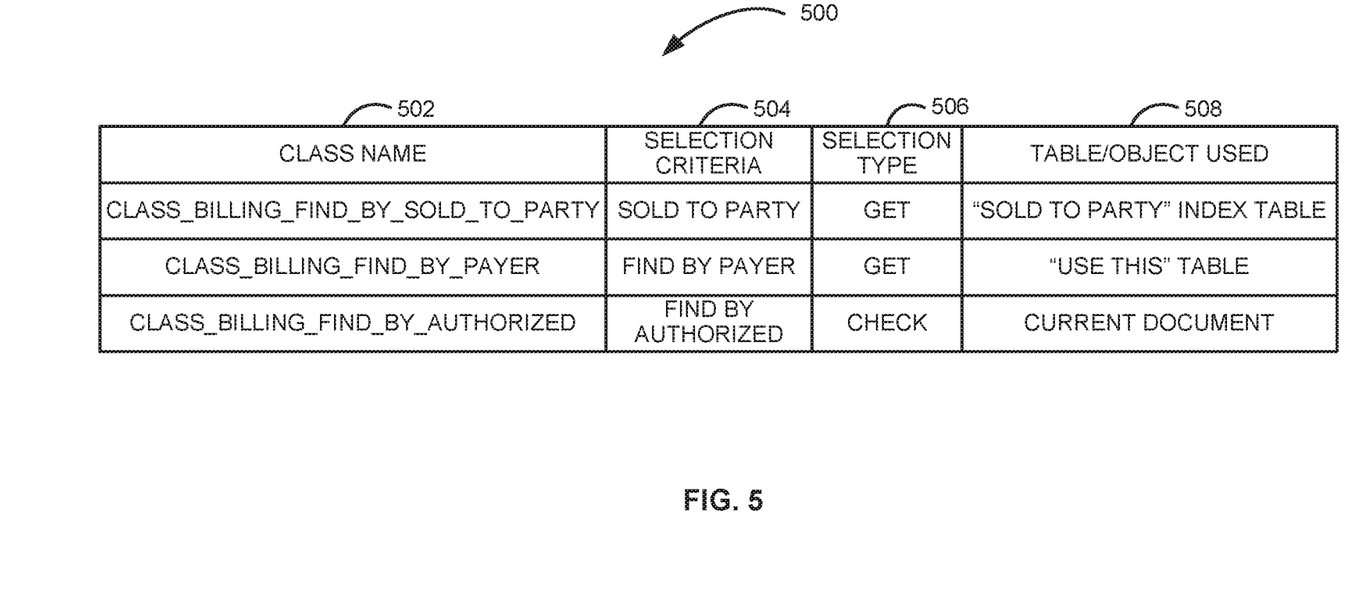
FIG. 5 is an exemplary block diagram illustrating the created "if billing find documents by elements" interface of FIG. 4, according to an embodiment.

FIG. 5 is an exemplary block diagram 500 illustrating the created "if_billing_find_docs_by_elements" interface 412 of FIG. 4, according to an embodiment. As shown, the "if_billing_find_does_by_elements"interface 412 includes a class name 502 of the class created corresponding to a particular selection criteria 504. Classes "class_billing_find_by_sold_to_party", "class_billing_find_by_payer", class_billing_find_by_authorized" are created corresponding to the selection criteria "sold to party", "find by payer", and "find by authorized", respectively. A selection type 506 is also provided corresponding to the classes, which identifies the implementation method for the "find by class." As shown by the selection type 506, the class "class_billing_find_by_sold_to_party" is to be implemented by a "get documents by" method. The "class_billing_find_by_payer" is to be implemented by a "get documents by" method, and the "class_billing_find_by_sold_to_party" is to be implemented by a "check documents by" method.

A table/object used 508 is also provided, which identifies the table/object identified by the "find by class". As shown by the table/object used 508, a "sold to party" index table is identified by the "class_billing_find_by_sold_to_party", a "use this" table, created by the user, is identified by the "class_billing_find_by_payer", and a current document is identified by the "class_billing_find_by_sold_to_party." The selection type "check" provides the logic to make the authorization check on the current document.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls or web services being used to implement or more of these components across a distributed programming environment. For example, a logic level may reside on a first computer system that is remotely located from a second computer system containing an interface level (e.g.., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
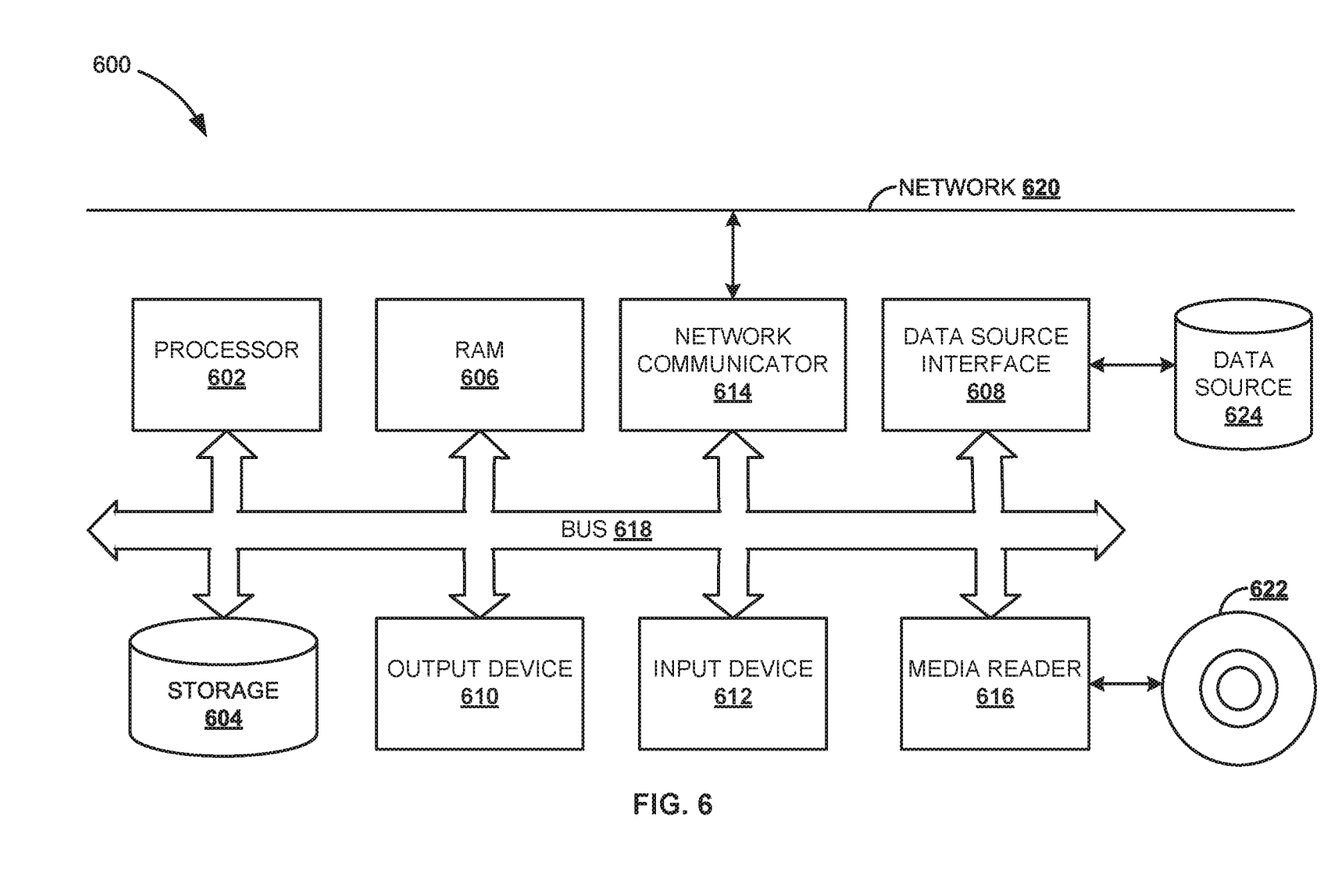
FIG. 6 is a block diagram illustrating a computing environment in which the techniques described for document search wrapper can be implemented, according to an embodiment.

FIG. 6 is a block diagram of an exemplary computer system 600. The computer system 600 includes a processor 602 that executes software instructions or code stored on a computer readable storage medium 622 to perform the above-illustrated methods of the invention. The computer system 600 includes a media reader 616 to read the instructions from the computer readable storage medium 622 and store the instructions in storage 604 or in random access memory (RAM) 606. The storage 604 provides a large space for keeping static data where at least some instructions could be stored for later execution. The stored instructions may be further compiled to generate other representations of the instructions and dynamically stored in the RAM 606. The processor 602 reads instructions from the RAM 606 and performs actions as instructed. According to one embodiment of the invention, the computer system 600 further includes an output device 610 (e.g.., a display) to provide at least some of the results of the execution as output including, but not limited to, visual information to users and an input device 612 to provide a user or another device with means for entering data and/or otherwise interact with the computer system 600. Each of these output devices 610 and input devices 612 could be joined by one or more additional peripherals to further expand the capabilities of the computer system 600. A network communicator 614 may be provided to connect the computer system 600 to a network 620 and in turn to other devices connected to the network 620 including other clients, servers, data stores, and interfaces, for instance. The modules of the computer system 600 are interconnected via a bus 618. Computer system 600 includes a data source interface 608 to access data source 624. The data source 624 can be accessed via one or more abstraction layers implemented in hardware or software. For example, the data source 624 may be accessed by network 620. In some embodiments the data source 624 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g.., OLAP), object oriented databases, and the like. Further data sources include tabular data (e.g.., spreadsheets, delimited text files), data tagged with a markup language (e.g., XML data), transactional data, unstructured data (e.g.., text files, screen scrapings), hierarchical data (e.g.., data in a file system, XML data), files, a plurality of reports, and any other data source accessible through an established protocol, such as. Open DataBase Connectivity (ODBC), produced by an underlying software system (e.g.., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for performing a database search, the method comprising:
   receiving a search request including two or more search criteria, wherein the search request is received by a base search wrapper class that defines a common search logic and at least one re-definable search method, wherein the common search logic is common for at least two different applications;
   based on the received search request, a processor of the computer, determining a find by class corresponding to at least one of the two or more search criteria, the find by class identifying an index table from a plurality of index tables, each of the index tables storing a plurality of unique identifiers that identify an entry corresponding to a field in a database, wherein each index table is different from the database;
   based on the at least one of the two or more search criteria, the processor of the computer, pre-selecting a unique identifier from the plurality of unique identifiers;
   based on the pre-selected unique identifier and remaining of the two or more search criteria, the processor of the computer, in response to the pre-selection of the unique identifier, selecting one or more documents from the database; and
   providing the selected one or more documents as a search result for the search request.

2. The computer implemented method according to claim 1, further comprising:
   determining, by the processor of the computer, a selection sequence for the determined find by class; and
   pre-selecting, by the processor of the computer, the unique identifier based on the determined selection sequence.

3. The computer implemented method according to claim 1, wherein determining the find by class includes:
   creating, by the processor of the computer, an instance of the find by class.

4. The computer implemented method according to claim 1, further comprising:
   comparing, by the processor of the computer, the one or more documents with a search criteria; and
   providing the selected one or more documents as the search result, based on the comparison.

5. The computer implemented method according to claim 1, wherein selecting the one or more documents includes:
   selecting the one or more documents from a header database table and an item database table in the database.

6. The computer implemented method according to claim 1, wherein the common search logic initiates the determination of the "find by class" based on the search criteria.

7. The computer implemented method according to claim 1, wherein one of the at least one re-definable search method is a constructor method that receives as input one or more internal attributes of an application specific search wrapper class, and wherein the application specific search wrapper class includes the common search logic from the base search wrapper class.

8. An article of manufacture including a non-transitory computer readable storage medium to tangibly store instructions, which when executed by a computer, cause the computer to:
   receive a search request including two or more search criteria, wherein the search request is received by a base search wrapper class that defines a common search logic and at least one re-definable search method, wherein the common search logic is common for at least two different applications;
   based on the received search request, determine a find by class corresponding to at least one of the two or more search criteria, the find by class identifying an index table from a plurality of index tables, each of the index tables storing a plurality of unique identifiers that identify an entry corresponding to a field in a database, and wherein each index table is different from the database;
   based on the at least one of the two or more search criteria, pre-select a unique identifier from the plurality of unique identifiers;
   based on the pre-selected unique identifier and remaining of the two or more search criteria, in response to the pre-selection of the unique identifier, select one or more documents from the database; and
   provide the selected one or more documents as a search result for the search request.

9. The article of manufacture according to claim 8, further comprising instructions which when executed by the computer further causes the computer to:
   determine a selection sequence for the determined find by class; and
   pre-select the unique identifier based on the determined selection sequence.

10. The article of manufacture according to claim 8, further comprising instructions which when executed by the computer further causes the computer to:
    create an instance of the find by class.

11. The article of manufacture according to claim 8, further comprising instructions which when executed by the computer further causes the computer to:
    compare the one or more documents with a search criteria; and
    provide the selected one or more documents as the search result, based on the comparison.

12. The article of manufacture according to claim 8, further comprising instructions which when executed by the computer further causes the computer to:
    select the one or more documents from a header database table and an item database table in the database.

13. A computer system for displaying an annotation in a plurality of visualization types, the computer system comprising:
    a memory to store a program code; and
    a processor communicatively coupled to the memory, the processor configured to execute the program code to:
    receive a search request including two or more search criteria, wherein the search request is received by a base search wrapper class that defines a common search logic and at least one re-definable search method, wherein the common search logic is common for at least two different applications;
    based on the received search request, determine a find by class corresponding to at least one of the two or more search criteria, the find by class identifying an index table from a plurality of index tables, each of the index tables storing a plurality of unique identifiers that identify an entry corresponding to a field in a database, wherein each index table is different from the database;
    based on the at least one of the two or more search criteria, pre-select a unique identifier from the plurality of unique identifiers;

based on the pre-selected unique identifier and remaining of the one or more search criteria, select one or more documents from the database; and provide the selected one or more documents as a search result for the search request.

14. The system of claim 13, wherein the processor further executes the program code to:

determine a selection sequence for the determined find by class; and pre-select the unique identifier based on the determined selection sequence.

15. The system of claim 13, wherein the processor further executes the program code to:

create an instance of the find by class.

16. The system of claim 13, wherein the processor further executes the program code to:

compare the one or more documents with a search criteria; and provide the selected one or more documents as the search result, based on the comparison.

17. The system of claim 13, wherein the processor further executes the program code to:

select the one or more documents from a header database table and an item database table in the database.

* * * * *